United States Patent [19]

Weigele

[11] Patent Number: 4,916,771
[45] Date of Patent: Apr. 17, 1990

[54] APPARATUS FOR WASHING THE WHEELS OF VEHICLES IN A WASHING PLANT

[76] Inventor: Gebhard Weigele, Am Schoenblick 1a, 8902 Neusaess, Fed. Rep. of Germany

[21] Appl. No.: 314,039

[22] Filed: Feb. 22, 1989

[30] Foreign Application Priority Data

Apr. 1, 1988 [DE] Fed. Rep. of Germany ... 8804404[U]

[51] Int. Cl.$^4$ ................................. B60S 3/06
[52] U.S. Cl. ........................... 15/53 B; 15/DIG. 2
[58] Field of Search ............... 15/53 R, 53 A, 53 AB, 15/53 B, 97 B, DIG. 2

[56] References Cited

U.S. PATENT DOCUMENTS

| | | | |
|---|---|---|---|
| 3,328,819 | 7/1967 | Doerschlag et al. | 15/53 B |
| 3,731,332 | 5/1973 | Bernardi | 15/53 A |
| 3,854,054 | 12/1974 | Conn, Jr. | 15/DIG. 2 |
| 3,913,162 | 10/1975 | Parkin | 15/53 B |

Primary Examiner—Edward L. Roberts
Attorney, Agent, or Firm—Flynn, Thiel, Boutell & Tanis

[57] ABSTRACT

The apparatus for washing the wheels (2) of vehicles in a washing plant has two oppositely arranged rotating wash brushes (4) each of which is associated with the wheels of one side of the vehicle and adjustable in the vehicle's direction of movement (B) on a carriage movable together with the vehicle in the vehicle's direction of movement (B) by means of a drive motor, and which during the washing phase can be pressed against one wheel (2) at a time. A light barrier (12, 13) is provided between the oppositely arranged carriages (6) and connected thereto and its light beam (15) is spaced from the axes of rotation (A) of the wash brushes (4) at a radial distance (R1) which corresponds approximately to the radius (R) of an average wheel size. A follower control device acting upon the drive motors (9) is designed in such a way that during the washing phase the carriages (6) can be advanced further in the vehicle's direction of movement (B) by the drive motors (9) according to the respective position of the wheel (2) about to be washed, which is scanned by the light barrier (12, 13).

5 Claims, 2 Drawing Sheets

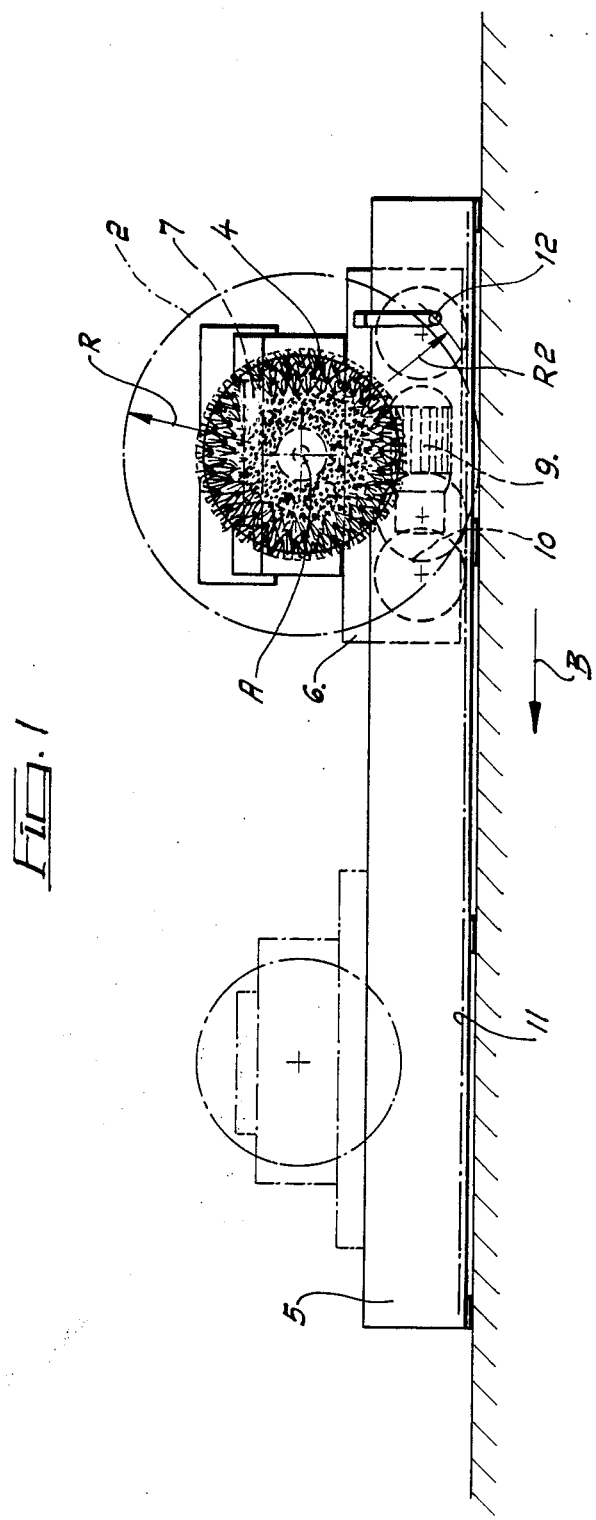

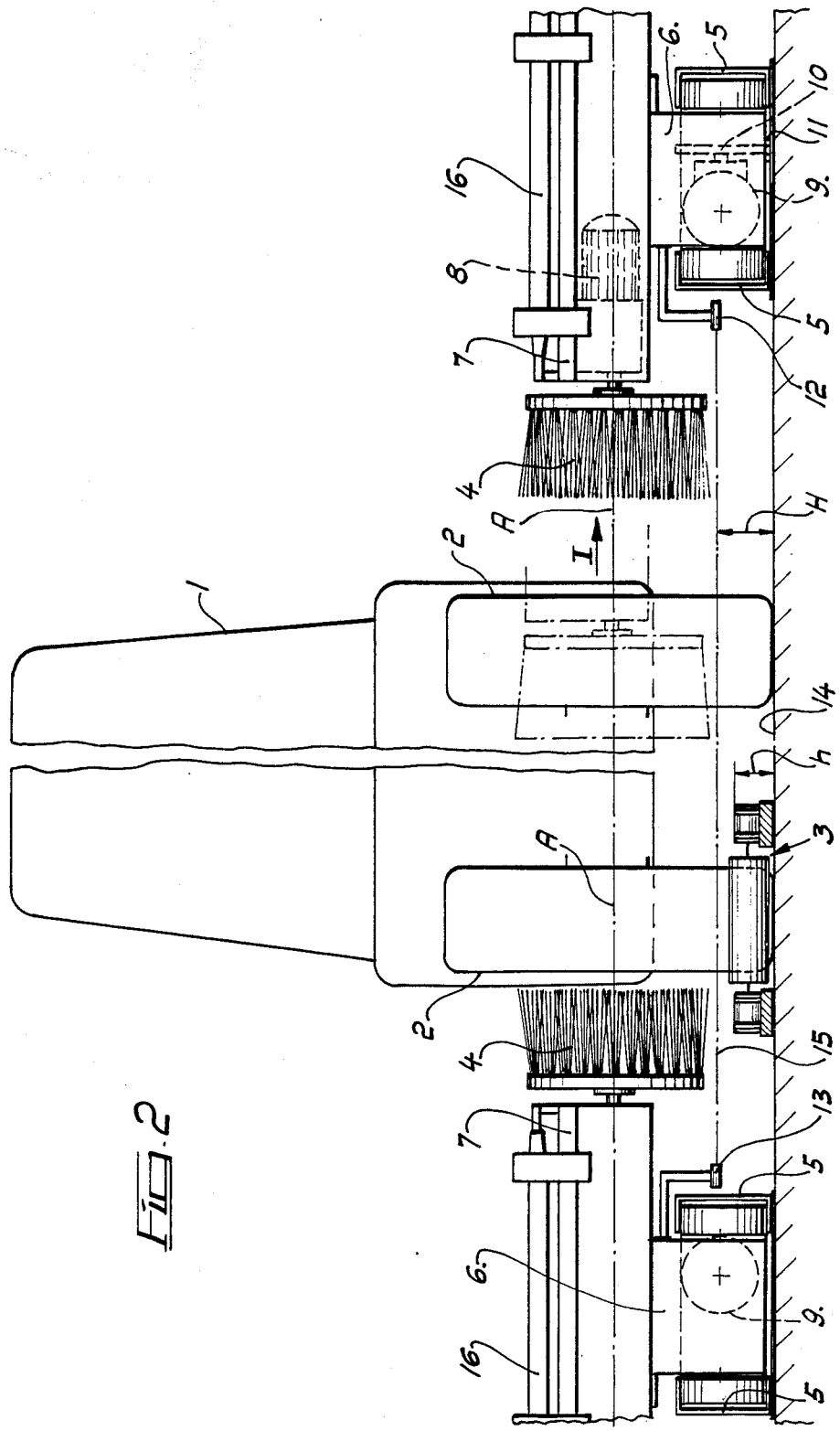

APPARATUS FOR WASHING THE WHEELS OF VEHICLES IN A WASHING PLANT

The invention concerns a apparatus for washing the wheels of vehicles in a washing plant, with two oppositely arranged rotating wash brushes, each of which is associated with the wheels of one side of the vehicle and adjustable transverse to the direction of movement of the vehicle on a carriage movable together with the vehicle in the direction of movement of the vehicle by means of a drive motor can be pressed against one wheel at a time during the washing phase, and with an electrical control means which acts on the drive motors and has a light barrier for scanning the position of the wheels with a light beam extending transverse to the direction of the movement of the vehicle.

In a known apparatus of this kind, each carriage is linked to a feeler roll which, under the effect of the carriage drive motor, moves from the rear against the wheel to be washed. The aim of this feeler roll is to approximately centre the rotational axis of the associated wash brush with the axis of the wheel to be washed. In order for the feeler roll to actually rest against the wheel to be washed, the drive motor must drive the carriage at a slightly greater speed than the speed at which the vehicle is moved forward by the conveyor belt. This can result in vehicles, particularly light vehicles, being moved forward by the feeler rolls at a speed which is faster than that intended by the conveyor belt. This can lead to breakdowns. For the feeler roll to fulfill its function, it must be arranged at a specific distance from the track. Also, on one side of the wheel in the region of the conveyor belt there are guide rails provided, which particularly serve to guide the wheels. In order for these guide rails to fulfil their function, they must be constructed as high as possible. Otherwise, in the case of custom-built bodies, the body parts reach quite far down so that there is no space left for the feeler rolls, or vehicles with low-lying bodies cannot be washed. Also, in the event of error impulses, the feeler roll travelling together with the wash brush in the direction towards the vehicle can damage the wheel or the low-lying body parts. Finally, the adjusting path of the entire brush aggregate transverse to the longitudinal direction of the vehicle must be greater with respect to the wash brush by the sweep of the feeler roll, which necessitates a greater hall width or expensive double telescopic guides for the brush aggregate. In these known apparatuses, a stationary light barrier is arranged in the travel path of the vehicle. If the light beam is interrupted by the advancing wheels of the vehicle, the light barrier activates the carriage drive motors and the carriages move together with the rotating wash brushes and the vehicle in the vehicle's direction of travel. When the carriages come to the end of their travel, limit switches reverse the drive motors to travel in the opposite direction so that the carriages return once again into their starting positions.

In other known apparatuses for washing vehicle wheels, the feeler rolls are arranged behind the rotating axes of the wash brushes, as seen in the direction of travel of the vehicle (DEAS AS 1 936 906 and DE-PS 21 26 347). As the vehicle moves forward, the feeler rolls position themselves against the wheels to be washed from the front and, as the vehicle travels on further, the wash brushes are carried along by the wheels in the vehicle's direction of travel. Although this arrangement of the feeler rolls prevents the vehicle from being advanced by the wheel washing apparatus in the manner described above, all the other above mentioned drawbacks do apply. Added to this also is the fact that the feeler roll can be run over by a wheel, for example when the vehicle is driven under its own power, or if the feeler roll no longer runs freely. The smaller the distance of the feeler roll from the track, the easier it is for it to be run over, although because of the low-lying body parts, this distance should be kept as small as possible.

It is the aim of the invention to produce a apparatus for washing the wheels of vehicles in a washing plant of the type mentioned at the beginning by means of which it is possible also to wash the wheels of vehicles with low-lying body parts without the danger of causing damage and without the drawbacks mentioned above.

According to the invention, this is achieved by providing the light barrier between the oppositely arranged carriages and connecting it thereto and its light beam (axis) is spaced from the axes of rotation (A) of the wash brushes (4) at a radial distance which corresponds approximately to the radius of an average wheel size, and that the control device is of the follower control type which is designed in such a way that during the washing phase the carriages can be moved further along in the vehicle's direction of movement by the drive motors according to the respective position of the wheel about to be washed, which is scanned by the light barrier.

The light barrier scans the vehicle wheels without touching, so that the vehicle is neither pushed by the wheel wash apparatus nor run over by the feeler rolls. The light barrier can be arranged at a very small distance above the guide rails and also requires only a very small free space above, so that it can also be used in vehicles with low-lying bodies. Thanks to the absence of feeler rolls, no damage is inflicted to the wheels or the body in the event of error impulses. The movement of the brush aggregates transverse to the direction of movement of the vehicle can be restricted to the paths required for the wash brushes to move into place, resulting in shorter adjusting paths and therefore also smaller building dimensions.

Advantageous developments of the apparatus according to the invention are characterised in the subordinate claims.

The invention is now explained in more detail with the aid of embodiment examples shown in the drawing. Depicted are:

FIG. 1 a side view in the direction I in FIG. 2,

FIG. 2 a front view of the apparatus.

In the drawing a vehicle, for example a motor car, is depicted by 1, the wheels 2 of which are to be washed by means of the apparatus in a washing plant. A conveyor belt 3 conveys the vehicle 1 through the washing plant in the vehicle's direction of movement B. On each side of the vehicle's path of travel there is provided a wash brush 4 rotating about a horizontal axis of rotation extending transverse to the vehicle's direction of movement B. For mounting each wash brush 4 there is provided a carriage 6 travelling along guide rails 5 in the vehicle's direction of movement B, the carriage 6 supporting a transverse carriage 7 which is displaceable transverse to the vehicle's direction of movement B. On the transverse carriage 7 is arranged the wash brush 4 with its brush motor 8.

The carriage 6 is powered by a drive motor 9 which drives a chain wheel 10. This chain wheel engages a fixed chain 11 running parallel to the guide rails 5.

Also, a light barrier consisting of a light emitter 12 and a light receiver 13 selenium cell) if provided between the two oppositely arranged carriages 6. The light emitter 12 and the light receiver 13 are rigidly connected with the associated carriages 6. Furthermore, the light emitter 12 and the light receiver 13 are spaced from the rotational axes A of the wash brushes 4 at a radial distance R1 which corresponds approximately to the radius of a wheel 2 of average size. The radial distance R1 is approximately 30 cm. The distance in height H of light emitter 12 and light receiver 13 with respect to the track 14 only has to be slightly higher than the maximum space h between the conveyor belt 3, or its guide rails, and the track 14. In this way it is possible for a light beam 15 emitted by the light emitter 12 to reach the light receiver 13 unhindered by the conveyor belt 3. The light barrier 12, 13, 15 is the signal transmitter for a follower control apparatus (not shown) acting upon the drive motors 9, which controls the drive motors 9 in such a way that the carriages 6, during the wash phase, are moved along in the vehicle's direction of movement B according to the respective position of the wheel 2 about to be washed, which is scanned by the light barrier 12, 13, 15. The operation of this follower control is best illustrated by the following description of the apparatus according to the invention.

In FIG. 1 in the vehicle's direction of travel is shown the right-hand wash brush in its starting position. When a vehicle 1 is transported by the conveyor belt 3 through the washing plant in the vehicle's direction of travel B, the light beam 15 of the light barrier 12, 13 is interrupted first. After a time delay, the light barrier is in readiness. As soon as the advancing front wheels of the vehicle release the light beam once again, the follower control switches on the two drive motors 9. These now drive their associated carriages 6 in the vehicle's direction of travel B at a speed which corresponds to the maximum speed of the conveyor belt 3. On release of the light beam 15, the brush motors 8 are also switched on so that the wash brushes 4 start to rotate At the same the air cylinders 16 move the wash brushes 4 in the direction towards the front wheels 2 to be washed and press the wash brushes against the front wheels 2. Approximately halfway along the travel path of the carriages 6, the rotation of the wash brushes is reversed in the known manner. At the maximum conveying speed of the conveyor belt 3, the carriages 6 and therefore also the wash brushes move in synchronism with the wheels 2 of the vehicle. When the conveying speed of the conveyor belt is slower, the carriages 6 move forward at a faster speed in relation to the vehicle, so that the light beam 15 once again enters the area of the wheels and is interrupted. Through the follower control this has the effect of stopping the drive motors 9 until the front wheels have travelled further on with respect to the idle carriages 6 and the light beam 15 is released once again. This "inching operation" produces small tolerances between the wheel axes 5 and the axes of rotation of the wash brushes 4, i.e. the wash brushes do not always wash precisely in the centre of the wheels or the rims. However, since the wheels 2 continue to rotate, a larger radius can be washed than would be possible with the largest radius of the rotating wash brushes 4. This has the advantage that large rims of low cross-sectional tyres can also be washed properly. After the carriages 6 have covered the larger part of their total adjusting path, the air cylinders 16 are acted upon by first limit switches in the opposite direction, so that the transverse carriages 7 are moved outwardly away from the vehicle 1. This causes the wash brushes 4 to become disengaged from the wheels 2. As soon as the carriages 6 have reached the end of their travel path, the drive motors 9 are reversed by second limit switches and the carriages 6 are then returned to their starting positions. The speed during the return movement into the starting position must be such that even at the highest conveyor belt speed and the shortest distance between the axes of the vehicle, the starting position should be reached again before the rear wheels pass the light barrier 12, 13. In the case of very short vehicles, if the starting position is not reached in time, as soon as the light barrier 12, 13, has passed the rear wheels and the light beam 15 is continuous once more, the light barrier switches the drive motors 9 for forward movement of the carriages 6 and these then follow the rear wheels in the manner described above.

The light barrier 12, 13 could also be arranged in such a way as to be located behind the axes of rotation A of the wash brushes 4 in the vehicle's direction of travel B. In this case the follower control device must be controlled in such a way that during each interruption of the light beam by the advancing wheel it switches the drive motors 9 on, and switches them off again as soon as the light barrier 15 is continuous again and located in front of the wheels, as a result of the carriages moving forward too rapidly. The first described kind of arrangement of the light barriers 12, 13 in the vehicle's direction of travel before the axes of rotation A of the wash brushes 4 was chosen so that the wash apparatus is not activated by e.g. a low-lying spoiler or a drooping, defective exhaust system.

I claim:

1. Apparatus for washing the wheels of vehicles in a washing plant, with two oppositely arranged rotating wash brushes each of which is associated with the wheels of one side of a vehicle and adjustable transverse to the direction of movement of the vehicle on a carriage movable together with the vehicle in the direction of movement of the vehicle by means of a drive motor and which during the washing phase can be pressed against one wheel at a time, and the drive motors are acted upon by an electrical control device having a light barrier for scanning the position of the wheels with a light beam extending transverse to the direction of movement of the vehicle, characterised in that the light barrier (12, 13) is provided between the oppositely arranged carriages (6) and is connected thereto and its light beam (axis) (15) is spaced from the axes of rotation (A) if the wash brushes (4) at a radial distance (R1) which corresponds approximately to the radius (R) of an average wheel size, and that the control device is of the follower control type which is designed in such a way that during the washing phase the carriages (6) can be advanced further in the vehicle's direction of movement (B) by the drive motors (9) according to the respective position of the wheel (2) about to be washed, which is scanned by the light barrier (12, 13).

2. Apparatus according to claim 1, characterised in that the light barrier (12, 13) is arranged in front of the axes of rotation (A) of the wash brushes in the vehicle'-direction of movement (B), and that during the washing phase the follower control switches on the drive motor (9) when the light beam (15) is continuous and switches the motor off when the light beam is interrupted.

3. Apparatus according to claim 1, characterised in that the light barrier (12, 13) is arranged behind the axes of rotation (A) of the wash brushes (4) in the vehicle's direction of movement (B), and that during the washing phase the follower control switches on the drive motor (9) when the light beam (15) is interrupted and switches the motor off when the light beam is continuous.

4. Apparatus according to claim 1, characterised in that the speed of the carriages (6) in the vehicle's direction of movement (B), produced by the drive motors (9) corresponds to the maximum conveying speed of the vehicles (1).

5. Apparatus according to claim 1, characterised in that the radial distance (R1) between the light barrier (12, 13) and the axes of rotation (A) of the wash brushes (4) is approximately 30 cm.

* * * * *

UNITED STATES PATENT AND TRADEMARK OFFICE
CERTIFICATE OF CORRECTION

PATENT NO. : 4,916,771
DATED : April 17, 1990
INVENTOR(S) : Gebhard WEIGELE

It is certified that error appears in the above-identified patent and that said Letters Patent is hereby corrected as shown below:

Column 4, line 55; change "if" to ---of---.

line 66; change "vehicle'-" to ---vehicle's---.

Signed and Sealed this

Twenty-seventh Day of August, 1991

Attest:

HARRY F. MANBECK, JR.

Attesting Officer

Commissioner of Patents and Trademarks